(12) United States Patent
Morris

(10) Patent No.: US 10,576,904 B1
(45) Date of Patent: Mar. 3, 2020

(54) MOUNTING PLATE FOR VEHICLE BIKE RACKS

(71) Applicant: Anthony Stephen Morris, New South Wales (AU)

(72) Inventor: Anthony Stephen Morris, New South Wales (AU)

( * ) Notice: Subject to any disclaimer, the term of this patent is extended or adjusted under 35 U.S.C. 154(b) by 0 days.

(21) Appl. No.: 16/232,996

(22) Filed: Dec. 26, 2018

(51) Int. Cl.
*B60R 13/10* (2006.01)
*B60R 9/10* (2006.01)
*B60R 9/06* (2006.01)

(52) U.S. Cl.
CPC ............... *B60R 9/10* (2013.01); *B60R 9/06* (2013.01); *B60R 13/105* (2013.01)

(58) Field of Classification Search
CPC .. B60R 9/10; B60R 9/06; B60R 9/065; B60R 13/105; B60R 13/10
See application file for complete search history.

(56) References Cited

U.S. PATENT DOCUMENTS

| 5,662,256 | A | * | 9/1997 | Bryan | B62H 3/02 224/523 |
| 5,810,542 | A | * | 9/1998 | Ostrander | B60R 9/06 224/497 |
| 5,950,891 | A | * | 9/1999 | Brungardt | B60R 9/06 224/497 |
| 2007/0090142 | A1 | * | 4/2007 | Chuang | B60P 3/07 224/496 |
| 2011/0253758 | A1 | * | 10/2011 | Bertrand | B60Q 1/2657 224/519 |
| 2016/0107583 | A1 | * | 4/2016 | Krishnan | B60R 9/10 224/536 |

* cited by examiner

*Primary Examiner* — Corey N Skurdal
(74) *Attorney, Agent, or Firm* — Johan Eide; Christopher Pilling; My Patent Guys

(57) ABSTRACT

The present invention solves the problems described above by presenting an improved mounting plate for vehicle bike racks allowing the user to directly mount a vehicle license plate to the mounting plate such that the license plate is visible and not obstructed by the bikes positioned on the vehicle bike rack. The mounting plate for vehicle bike racks includes a rigid body having a flat mounting surface, a plurality of holes positioned on the flat mounting surface, a pair of rotatable arms and a pair of connection members configured to attach to a vehicle bike rack.

14 Claims, 8 Drawing Sheets

MOUNTING PLATE FOR VEHICLE BIKE RACKS

BACKGROUND

1. Field of the Invention

The present invention relates to an improved mounting plate for vehicle bike racks for securing a bicycle to a vehicle.

2. Description of Related Art

Traditionally bicycle mounts for attaching bicycles to vehicles via a trailer hitch, spare tire mounts, and bumpers are well known. Traditional types of bicycle racks typically include a support arm structure for spacing the bicycle away from the vehicle and modular latches for securing the bicycle frame to the support arm.

Such traditional bicycle rack latches and support arms are cumbersome and expensive to produce due the necessary amount of metal needed to securely attach the support arms members to rigid structures of the vehicle such as a hitch or bumper. Traditional bicycle racks for transportation also commonly block the alphanumeric characters of the license plate of a vehicle. This results in obstructing law enforcement or others attempting to read the license plate's alphanumerical characters from clearly doing so. Furthermore, bicycle racks for multiple bicycles are often even more cumbersome than single bicycle racks. Consequently, there is a need for a mounting plate for vehicle bike racks.

SUMMARY

The present invention solves the problems described above by presenting an improved mounting plate for vehicle bike racks allowing the user to directly mount a vehicle license plate on an existing bicycle rack. In one embodiment, re-utilizing or replacing the fasteners already securing the license plate to the vehicle allows for quick and easy installation by the user, while still not obstructing the visibility of the user's vehicle identification plate. In another embodiment, an additional license plate may be used if desired. Furthermore, the mounting plate for vehicle bike racks is non-invasive to the user's vehicle and does not require any mounting directly to the vehicle.

Another object of the invention is to provide a minimalistic and appealing design for the user. The rotatable arms of the mounting plate for vehicle bike racks folds down behind the flat mounting surface and remain hidden from view when not in use. Furthermore, the mounting plate for vehicle bike racks can remain on the vehicle when not in use and requires no disassembly between uses. This feature offers a sleek and appealing design in contrast to the user's vehicle. Another object of the invention is to reduce unnecessary damage to the exterior paint of the user's vehicle by creating mounting locations not directly upon the exterior of the user's vehicle.

In order to do so, a mounting plate for vehicle bike racks is provided, comprising a rigid body having a flat mounting surface; a plurality of holes positioned on the flat mounting surface, each hole of the plurality of holes adapted to receive a fastener; a pair of rotatable arms having a proximal end and a distal end, the pair of rotatable arms positioned at opposite ends of the rigid body and configured to rotate about the proximal end; a pair of connection members positioned at the distal end of the pair of rotatable arms, wherein the pair of connection members is configured to attach to a vehicle bike rack; and the flat mounting surface adapted to receive a portion of a vehicle identification plate having at least one attachment hole, wherein the vehicle identification plate is secured to the flat mounting surface by aligning at least one hole of the plurality of holes and the at least one attachment hole via the fastener.

BRIEF DESCRIPTION OF THE FIGURES

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF CERTAIN EMBODIMENTS

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 0%, 5%, or 10%, including increments therein.

Unless otherwise defined, all technical terms used herein have the same meaning as commonly understood by one of ordinary skill in the art to which this disclosure belongs.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

Figure 1A:
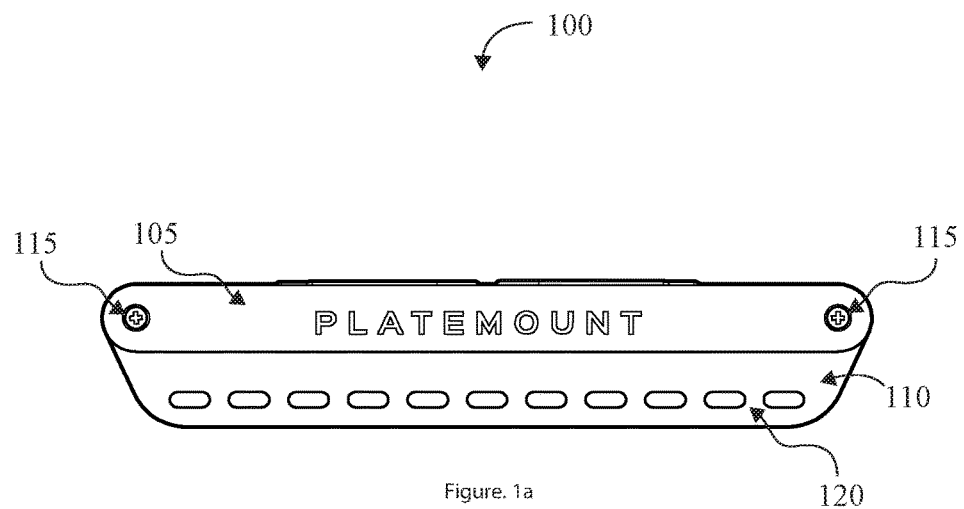
FIG. 1A illustrates an exemplary front view of a mounting plate for vehicle bike racks with the pair of rotatable arms hidden from view in a downward position according to an embodiment of the present invention.

FIG. 1A illustrates an exemplary front view of a mounting plate 100 for vehicle bike racks with a pair of rotatable arms 125 hidden from view in a downward position. The mounting plate comprises a rigid body 105 having a first end, a second end and a flat mounting surface 110 adjoined thereto. Each of the pair of rotatable arms having a proximal end and a distal end, and are adjoined to the rigid body by a pair of arm fasteners 115 at their proximal end. In one embodiment, the arm fasteners extend through the rigid body and the rotatable arms. In one embodiment, a pair of connection members 130 are positioned at the distal end of the pair of rotatable arms and are configured to attach to a vehicle bike rack. In one embodiment, a vehicle identification plate is mounted by the user by securing a fastener through a plurality of holes 120 aligned on the flat mounting surface 110 into an attachment hole of a vehicle identification plate 150. In one embodiment, the plurality of holes spans the entirety of the length of the flat mounting surface. In one embodiment, a pair of spacing elements 140 are positioned between the rigid body and the pair of rotatable arms, wherein the pair of spacing elements prevent interference from the connection members when the rotatable arms are in a downward position behind the ridged body. When not in use, the mounting plate is stored in a downward position by aligning the pair of rotatable arms and the pair of connection members to be parallel with the length of the rigid body, as seen in FIG. 1A.

Figure 1B:
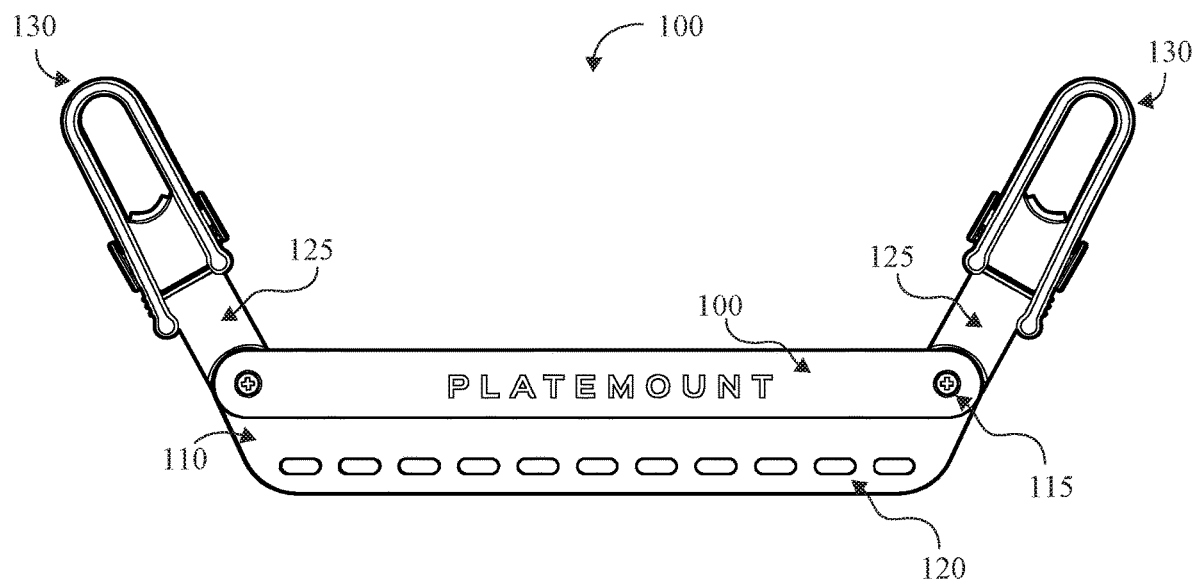
FIG. 1B illustrates an exemplary front view of the mounting plate with the pair of rotatable arms shown in an upright position according to an embodiment of the present invention.

FIG. 1B illustrates an exemplary front view of the mounting plate for vehicle bike racks with the pair of rotatable arms shown in an upright position. In FIG. 1B, the pair of rotatable arms and the pair of connection members adjoined thereto are shown in an upright position. In some embodiments, the connection members is a stretchable strap having a plurality of length adjustment holes, wherein a length adjustment hole of the plurality of length adjustment holes is configured to connect to a protruding attachment knob positioned on the distal end of the pair of rotatable arms. In some embodiments, the pair of connection members 130 can comprise of at least one member of a connection set consisting of: a ratcheting strap, an elastic strap, and a draw latch.

The mounting plate can be made by at least one of the following processes, by way of non-limiting example, including: a 3D printing process, an injection moldings process, a CNC milling process, a rotational mold forming process, a blow molding process, a compression molding process and a vacuum forming process. In some embodiments, the mounting plate is made of at least one material of a material set consisting of: a wood material, a plastic material, a metal material, a rubber material, a polymer material, a fiberglass material, and a composite material. The plastic material used to make the mounting plate can be one of the following plastic material types, by way of non-limiting example, a polyethylene terephthalate (PETE or PET) plastic, a polyethylene (PE) plastic, a polyvinyl chloride (PVC) plastic, a polypropylene (PP) plastic, a polystyrene (PS) plastic, a polylactic acid (PLA) plastic, a thermoplastic, a polycarbonate (PC) plastic, an acrylic (PMMA) plastic, a acetal plastic, a nylon plastic, and an acrylonitrile butadiene styrene (ABS) plastic.

Figure 2A:
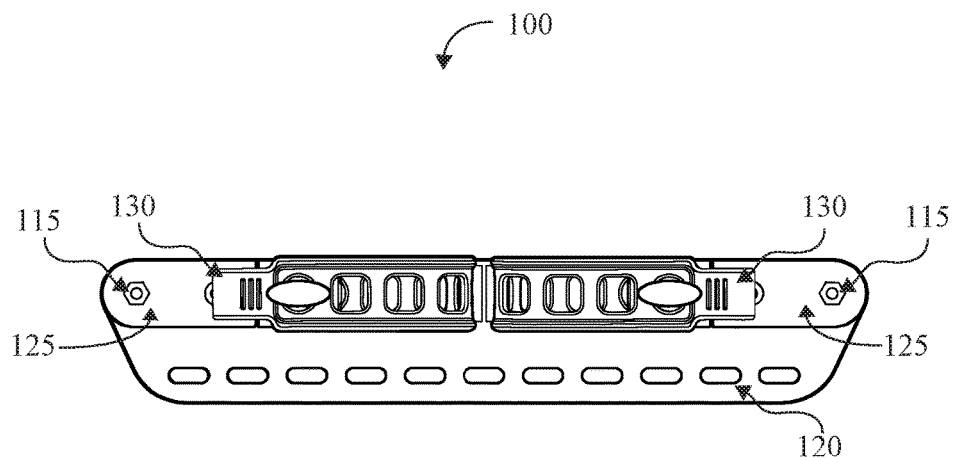
FIG. 2A illustrates an exemplary rear view of the mounting plate with the pair of rotatable arms shown in a downward position according to an embodiment of the present invention.
Figure 2B:
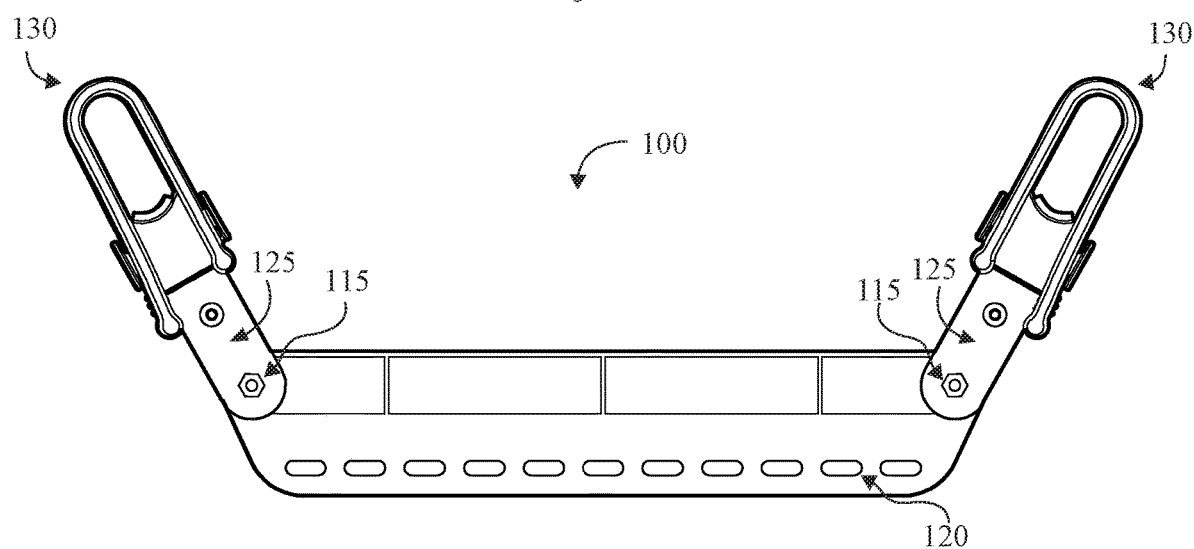
FIG. 2B illustrates an exemplary rear view of the mounting plate with the pair of rotatable arms shown in an upright position according to an embodiment of the present invention.

FIG. 2A illustrates an exemplary rear view of the mounting plate for vehicle bike racks with the pair of rotatable arms shown in a downward position. In the current exemplary embodiment, the arm fasteners arm shown as a threaded bolts and nuts passing from the rigid body through the pair of rotatable arms. In some embodiments, the arm fastener can comprise of a push-to-fit plastic member, a clamp, a rivet, and a peg. FIG. 2B illustrates an exemplary rear view of the mounting plate with the pair of rotatable arms shown in an upright position.

Figure 3A:
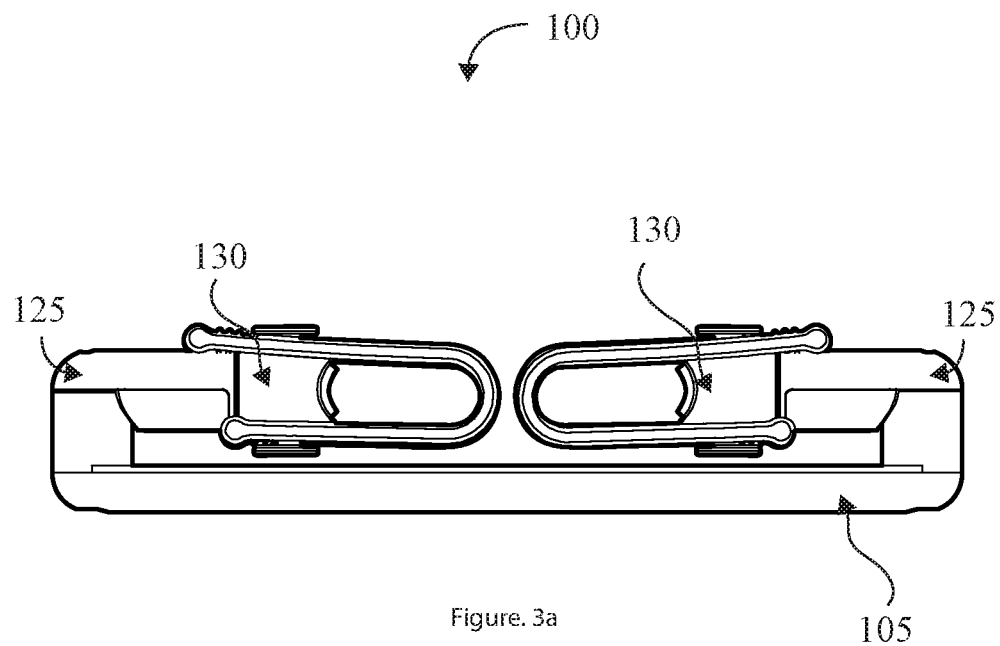
FIG. 3A illustrates an exemplary top view of the mounting plate according to an embodiment of the present invention.

FIG. 3A illustrates an exemplary top view of the mounting plate with the pair of rotatable arms shown. In some embodiments, the design of the pair of rotatable arms stops the rotation of the pair of rotatable arms 125 when the downward position is reached, and the pair of rotatable arms are parallel to the rigid body. Similarly, in some embodiments, the pair of rotatable arms are configured to stop in the upright position, as shown in FIG. 2B. In some embodiments, the upright position can be up to 350 degrees in axial rotation from the downward position in a counterclockwise direction. In some embodiments, the upright position can be up to 350 degrees in axial rotation from the downward position in a counter-counterclockwise direction. In some embodiments, the pair of rotatable arms can rotate 360 degrees.

Figure 3B:
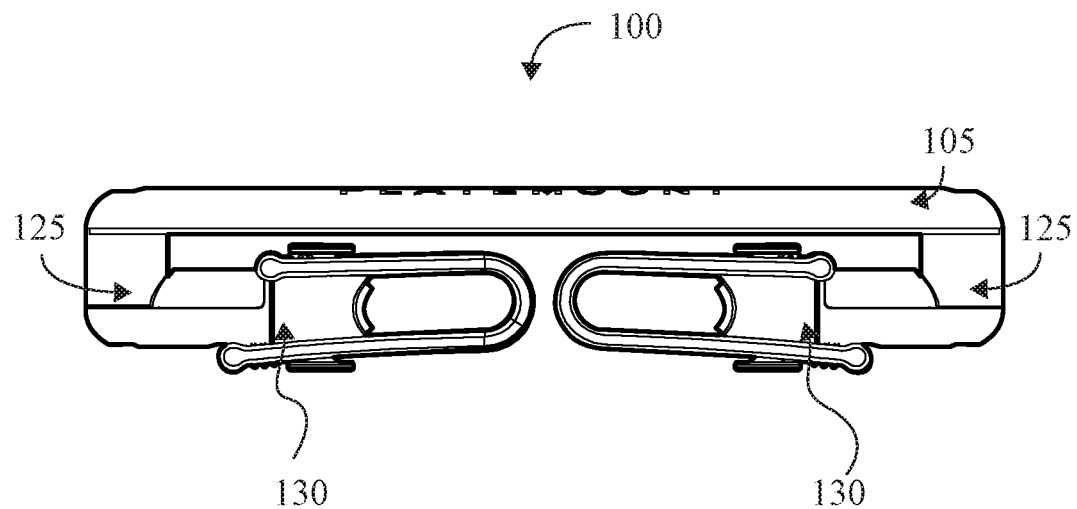
FIG. 3B illustrates an exemplary bottom view of the mounting plate according to an embodiment of the present invention.

FIG. 3B illustrates an exemplary bottom view of the mounting plate with the pair of rotatable arms shown. In FIG. 3B, the exemplary pair of connection members comprise of a stretchable strap having a plurality of length adjustment holes, wherein a length adjustment hole of the plurality of length adjustment holes is configured to connect to a protruding attachment knob 145 positioned on the distal end of the pair of rotatable arms. In some embodiments, the stretchable strap may include a textured end tab for assisting the user in attaching the stretchable strap around the vehicle bike rack and therefore back onto the rotatable arms. In some embodiments, both sides of the stretchable strap of the pair of connection members comprise a protruding attachment knob. In alternative embodiments, only one side of the stretchable strap of the pair of connection members comprises a protruding attachment knob.

Figure 4A:
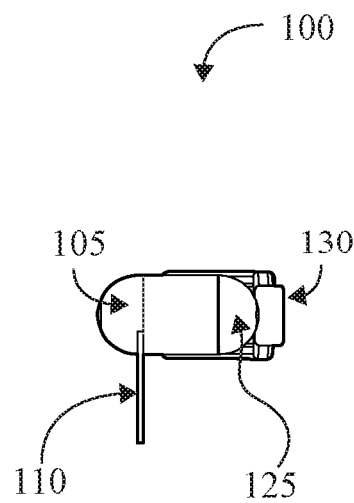
FIG. 4A illustrates an exemplary right view of the mounting plate with the pair of rotatable arms shown in a downward position according to an embodiment of the present invention.
Figure 4B:
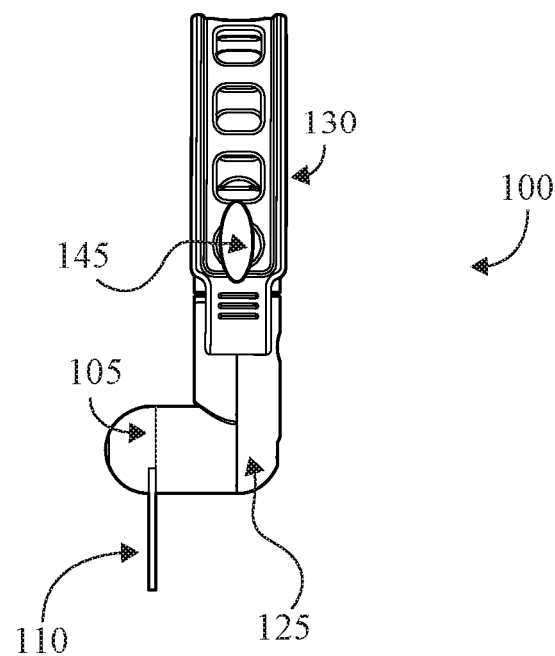
FIG. 4B illustrates an exemplary right view of the mounting plate with the pair of rotatable arms shown in an upright position according to an embodiment of the present invention.

FIG. 4A illustrates an exemplary right view of the mounting plate with the pair of rotatable arms shown in a downward position. FIG. 4B illustrates an exemplary right view of the mounting plate with the pair of rotatable arms shown in an upright position. In some embodiments, the protruding attachment knob of the pair of connection members can be made as, by way of non-limiting example, a honeycomb shape, a diamond shape, a square, a triangle, a rectangle, an octagon and an oval. In some embodiments, the plurality of length adjustment holes of the pair of connection members can be made as, by way of non-limiting example, a honeycomb shape, a diamond shape, a square, a triangle, a rectangle, an octagon and an oval.

Figure 5:
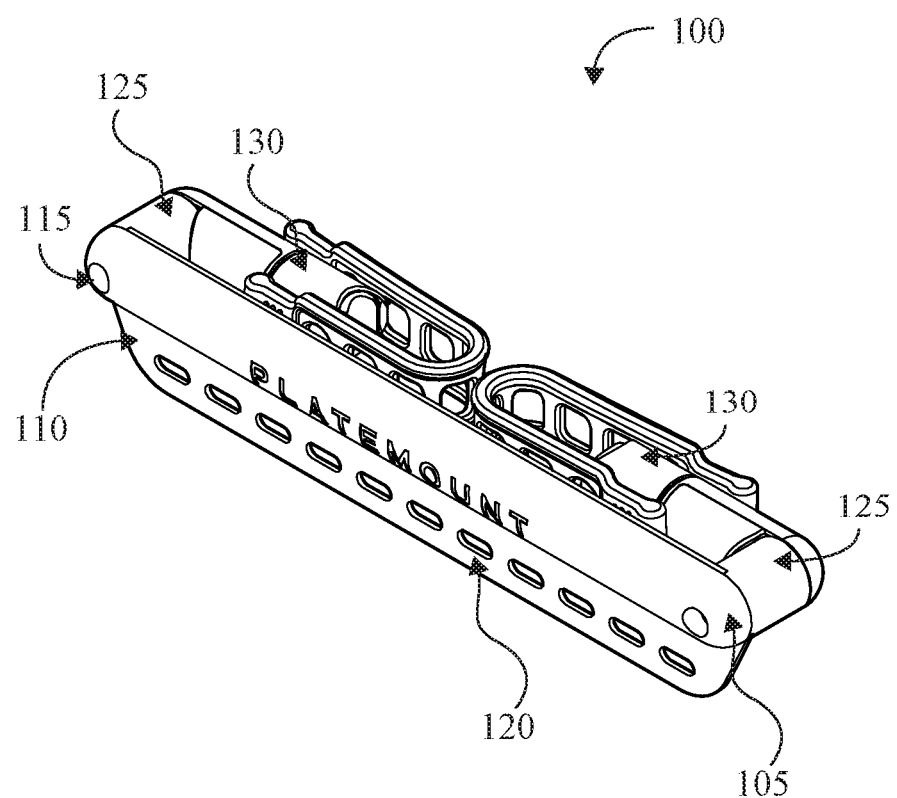
FIG. 5 illustrates an exemplary isometric view of the mounting plate with the pair of rotatable arms shown in a downward position according to an embodiment of the present invention.
Figure 6:
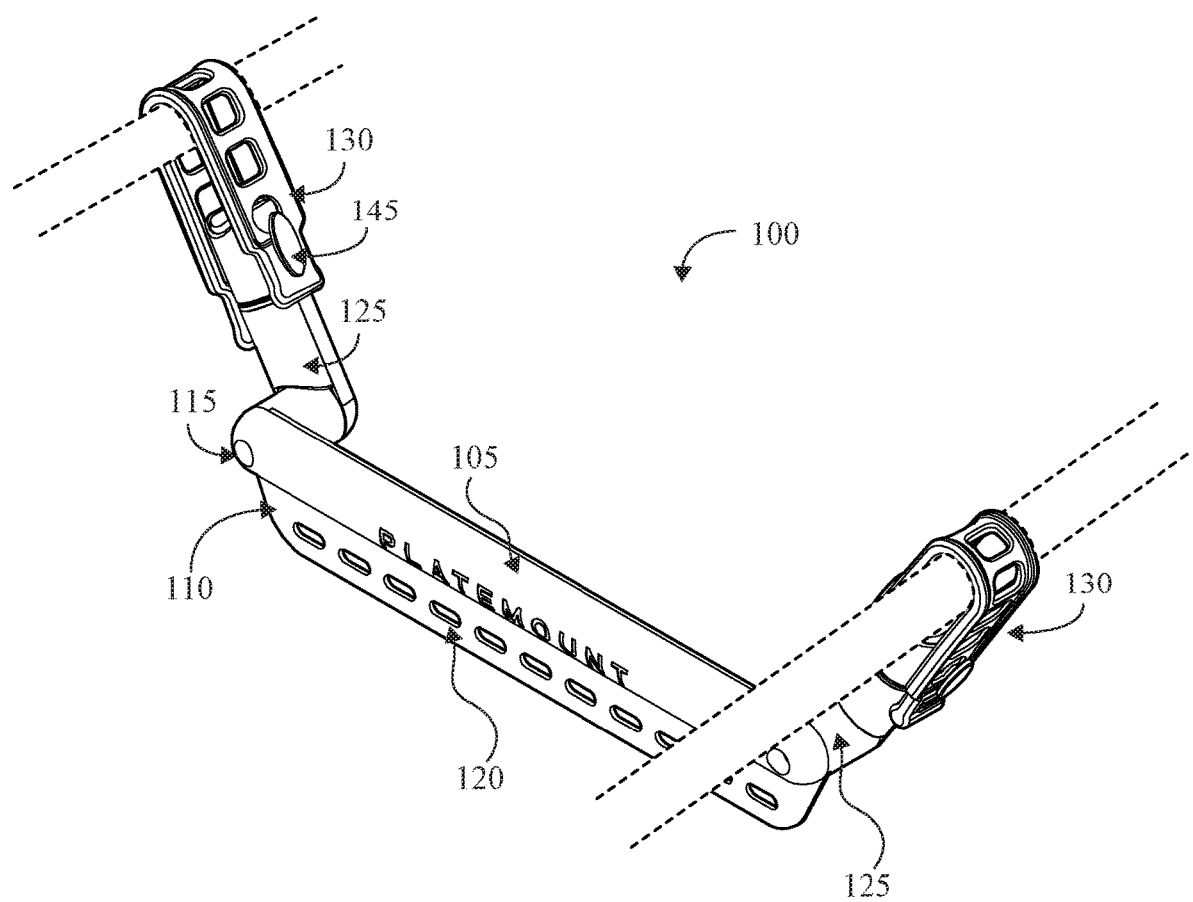
FIG. 6 illustrates an exemplary isometric view of the mounting plate with the pair of rotatable arms shown in an upright position attached to a vehicle bike rack according to an embodiment of the present invention.

FIG. 5 illustrates an exemplary isometric view of the mounting plate with the pair of rotatable arms shown in a downward position. FIG. 6 illustrates an exemplary isometric view of the mounting plate for vehicle bike racks with the pair of rotatable arms shown in an upright position. The pair of connection members serves to attach to a pair of rods 155 of a vehicle bike rack. In FIG. 6, an exemplary pair of rods of a vehicle bike rack are shown whereto a bicycle frame would rest upon, as well known in the art.

Figure 7:
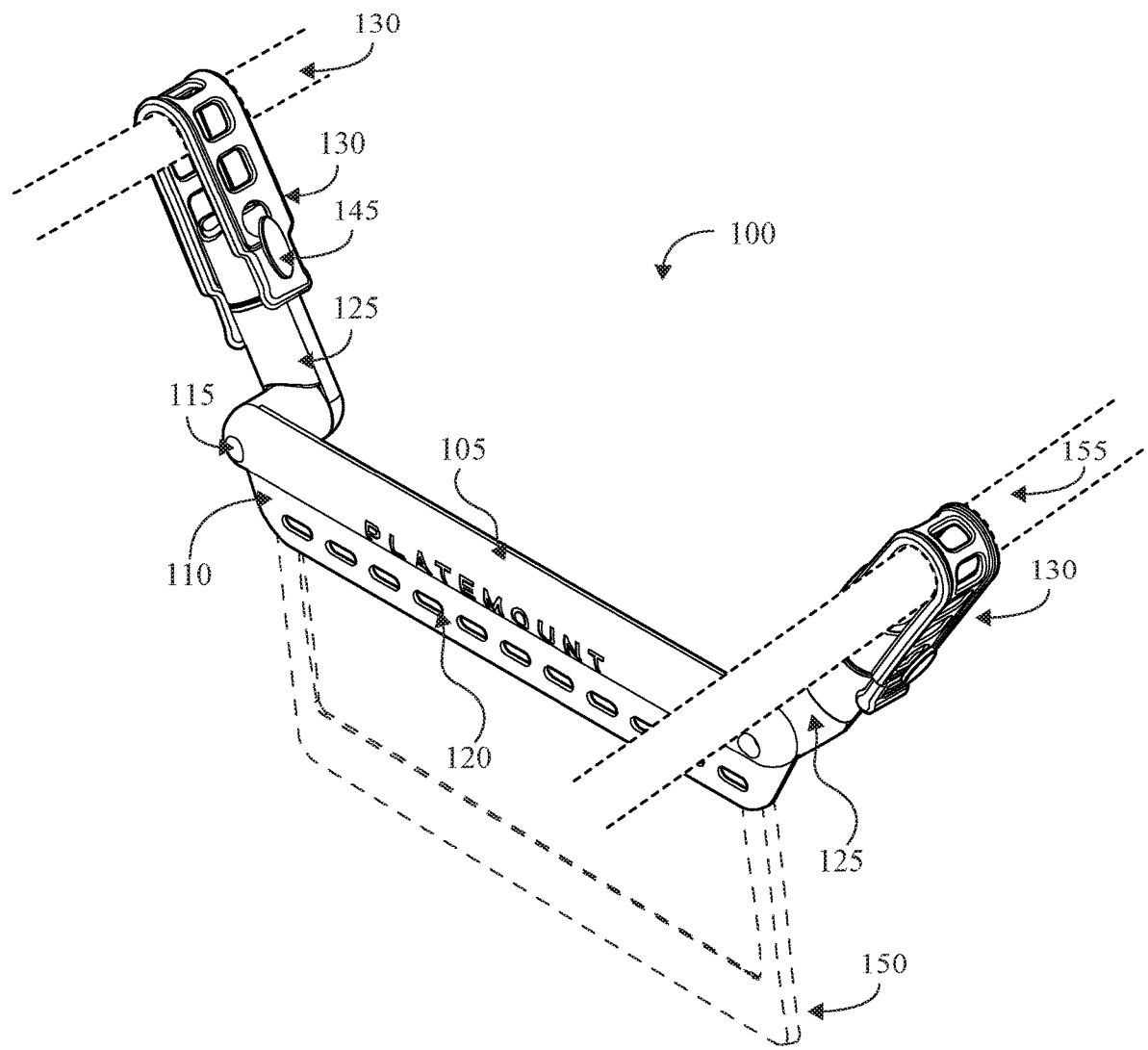
FIG. 7 illustrates an exemplary isometric view of the mounting plate with the pair of rotatable arms shown in an upright position attached to the vehicle bike round, with a vehicle identification plate mounted to the device according to an embodiment of the present invention.

FIG. 7 illustrates an exemplary isometric view of the mounting plate with the pair of rotatable arms shown in an upright position mounted to a vehicle bike rack. The flat mounting surface of the mounting plate is shown aligned to and parallel a vehicle identification plate 150. In some embodiments, the vehicle identification plate is selected from the group essentially consisting of: a vehicle number plate, a license plate, and a registration plate. In some embodiments, the flat mounting surface is adjoined to a vehicle license plate frame, wherein the vehicle license plate frame surrounds the vehicle identification plate.

Figure 8:
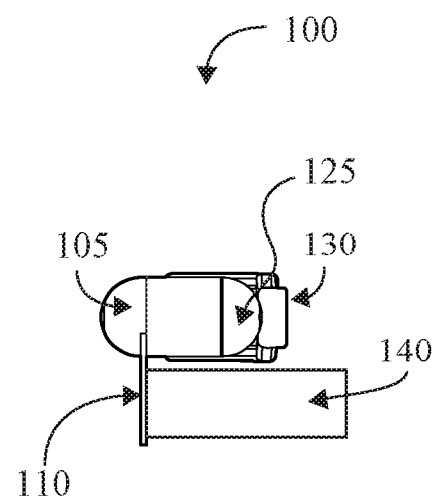
FIG. 8 illustrates an exemplary right view of the mounting plate with the pair of rotatable arms shown in a downward position and a pair of spacing elements according to an embodiment of the present invention.

FIG. 8 illustrates an exemplary right view of the mounting plate with the pair of rotatable arms and a pair of spacing elements 140 shown in a downward position. The current exemplary spacing elements for the mounting plate for vehicle bike racks, in some embodiments, can be independent of the flat mounting surface and during use is placed between the flat mounting surface and vehicle identification plate. In some embodiments, the spacing element is adjoined to the flat mounting surface of the rigid body.

Any element in a claim that does not explicitly state "means for" performing a specified function, or "step for" performing a specified function, is not to be interpreted as a "means" or "step" clause as specified in 35 U.S.C. § 112, 6. In particular, any use of "step of" in the claims is not intended to invoke the provision of 35 U.S.C. § 112, 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A mounting plate for vehicle bike racks comprising:
   a rigid body having a flat mounting surface;
   a plurality of holes positioned on the flat mounting surface, each hole of the plurality of holes adapted to receive a fastener;
   a pair of rotatable arms having a proximal end and a distal end, the pair of rotatable arms positioned at opposite ends of the rigid body and configured to rotate about the proximal end;
   a pair of connection members positioned at the distal end of the pair of rotatable arms, wherein the pair of connection members is configured to attach to a vehicle bike rack; and,
   the flat mounting surface adapted to receive a portion of a vehicle identification plate having at least one attachment hole, wherein the vehicle identification plate is secured to the flat mounting surface by aligning at least one hole of the plurality of holes and the at least one attachment hole via the fastener.

2. The mounting plate of claim 1, wherein the plurality of holes extend the entirety of the flat mounting surface.

3. The mounting plate of claim 1, wherein each connection member of the pair of connection members is a stretchable strap having a plurality of length adjustment holes, wherein a length adjustment hole of the plurality of length adjustment holes is configured to connect to a protruding attachment knob positioned on the distal end of the pair of rotatable arms.

4. The mounting plate of claim 1, wherein the pair of rotatable arms is configured to rotate parallel to the rigid body minimizing the size of the mounting plate when not in use.

5. The mounting plate of claim 1, wherein the pair of connection members is configured to attach to a pair of rods of the vehicle bike rack.

6. The mounting plate of claim 1, wherein the vehicle identification plate is selected from the group essentially consisting of: a vehicle number plate, a license plate, and a registration plate.

7. A mounting plate for vehicle bike racks comprising:
   a rigid body having a first length, a first width, a first height, a first end, a second end, and a bottom surface;
   a flat mounting surface having a second length, a second width, and a second height, the flat mounting surface extending downward from the bottom surface;
   a plurality of holes positioned on the flat mounting surface, each hole of the plurality of holes adapted to receive a fastener;
   a pair of spacing elements attached to the first and second ends of rigid body;
   a pair of rotatable arms having a proximal end and a distal end, the proximal end of pair of rotatable arms attached to the pair of spacing elements, wherein the pair of rotatable arms is configured to rotate about an axis of the pair of spacing elements;
   a pair of connection members positioned at the distal end of the pair of rotatable arms, wherein the pair of connection members is configured to attach to a vehicle bike rack; and,
   the flat mounting surface adapted to receive a portion of a vehicle identification plate having at least one attachment hole, wherein the vehicle identification plate is secured to the flat mounting surface by aligning at least one hole of the plurality of holes and the at least one attachment hole via the fastener.

8. The mounting plate of claim 7, wherein the first length is greater than the first height.

9. The mounting plate of claim 7, wherein the first width is greater than the second width.

10. The mounting plate of claim 7, wherein the plurality of holes extend the entirety of the second length.

11. The mounting plate of claim 7, wherein each connection member of the pair of connection members is a stretchable strap having a plurality of length adjustment holes, wherein a length adjustment hole of the plurality of length adjustment holes is configured to connect to a protruding attachment knob positioned on the distal end of the pair of rotatable arms.

12. The mounting plate of claim 7, wherein the pair of rotatable arms is configured to rotate parallel to the rigid body minimizing the size of the mounting plate when not in use.

13. The mounting plate of claim 7, wherein the pair of connection members is configured to attach to a pair of rods of the vehicle bike rack.

14. The mounting plate of claim 7, wherein the vehicle identification plate is selected from the group essentially consisting of: a vehicle number plate, a license plate, and a registration plate.

* * * * *